United States Patent [19]

Ratcliffe

[11] Patent Number: 4,562,576
[45] Date of Patent: Dec. 31, 1985

[54] DATA STORAGE APPARATUS

[75] Inventor: Michael J. Ratcliffe, Cheadle Hulme, England

[73] Assignee: International Computers Limited, London, England

[21] Appl. No.: 518,946

[22] Filed: Aug. 1, 1983

[30] Foreign Application Priority Data

Aug. 14, 1982 [GB] United Kingdom ............... 8223439

[51] Int. Cl.⁴ .......................................... G06F 11/10
[52] U.S. Cl. ...................................... 371/21; 371/10; 371/38
[58] Field of Search ................... 371/21, 2, 38, 10, 11; 365/230, 201; 364/200, 900

[56] References Cited

U.S. PATENT DOCUMENTS

| | | | |
|---|---|---|---|
| 3,697,949 | 10/1972 | Carter et al. | 371/38 |
| 4,006,467 | 2/1977 | Bowman | 365/230 |
| 4,007,028 | 2/1978 | Lui et al. | 371/38 |
| 4,276,647 | 6/1981 | Thacker et al. | 371/38 |
| 4,394,763 | 7/1983 | Nagano et al. | 371/10 |
| 4,453,251 | 6/1984 | Osman | 371/38 |
| 4,459,685 | 7/1984 | Sud et al. | 371/10 |
| 4,460,997 | 7/1984 | Harns | 371/10 |
| 4,460,998 | 7/1984 | Yamada | 371/10 |
| 4,464,754 | 8/1984 | Stewart et al. | 371/10 |
| 4,471,472 | 9/1984 | Young | 371/10 |
| 4,475,194 | 10/1984 | La Vallee et al. | 371/10 |

Primary Examiner—Michael R. Fleming
Attorney, Agent, or Firm—Lee, Smith & Zickert

[57] ABSTRACT

Data storage apparatus consisting of an array of RAM chips, with Hamming code checking for detecting double-bit errors. Address signals are fanned-out to the chips by way of driver circuits. Each driver circuit distributes an address bit to only two columns of chips (or in some case, just one column), so that is one of the driver circuits fails, no more than two chips in each row will be affected. Hence, no more than two bits in any data word will be in error, and this can be detected by the Hamming code.

3 Claims, 3 Drawing Figures

DATA STORAGE APPARATUS

BACKGROUND TO THE INVENTION

This invention relates to data storage apparatus.

It is well known to provide data storage apparatus with some form of error detection and correction logic. For example, Hamming codes are typically able to detect double bit errors and to detect and correct single bit errors.

It is also well known to construct data storage apparatus from a number of memory devices such as random access memory chips. The chips may for example be mounted on a printed circuit board which provides input and output connections for data and for various control signals such as address bits, strobe signals and so on. The control signals are supplied to all the chips in parallel, and this usually requires the provision of suitable driver circuits for supplying the necessary drive current for fanning out each control signal to a number of chips.

One problem with such an arrangement is that if one of the driver circuits fails, it can cause several chips to give an incorrect output, leading to multiple errors which cannot be detected by the error detection logic.

SUMMARY OF THE INVENTION

One object of the invention is to provide data storage apparatus in which failure of a driver circuit does not lead to undetectable errors.

According to the invention there is provided data storage apparatus for storing multi-bit data words, the apparatus comprising:

(a) a plurality of memory devices each having a plurality of individually addressable storage locations, (b) error detecting means capable of detecting n-bit errors in any data word stored in the memory devices, where n is greater than one, and (c) a plurality of driver circuits for distributing a control signal in parallel to all the memory devices, wherein each driver circuit supplies the control signal to a group of data storage devices containing no more than n bits belonging to any one data word.

Thus, it can be seen that, if a driver circuit fails this will affect, at most, only n bits in any given data word and hence any errors resulting from this failure will be detectable by the error detecting means.

In a particular embodiment of the invention, the storage apparatus comprises a plurality of rows of memory devices, the bits of any given word all being stored in the same row, and each driver circuit supplies the control signal to no more than n memory devices in each row.

BRIEF DESCRIPTION OF THE DRAWINGS

One data storage apparatus in accordance with the invention will now be described by way of example with reference to the accompanying drawings, of which.

DESCRIPTION OF AN EMBODIMENT OF THE INVENTION

Figure 1:
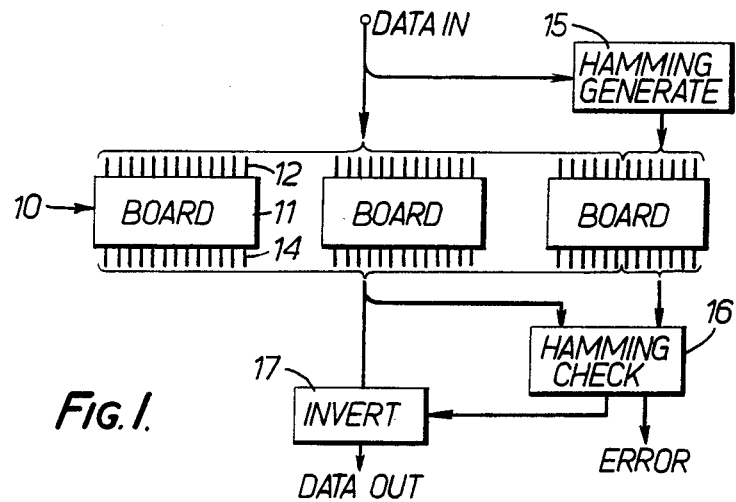
FIG. 1 is an overall diagram of the storage apparatus.

Referring to FIG. 1, the data storage apparatus comprises a data store 10 having 512K individually addressable locations, each holding 39 bits. The first 32 bits in each location represent a data word, while the remaining 7 bits represent a Hamming code for checking and correcting the data.

The store 10 is constructed from three identical printed circuit boards 11, each of which holds a 13-bit-wide section of the store. Each board has thirteen data input terminals 12 and thirteen data output terminals 14 for input and output of data or Hamming code bits.

Each input data word is fed to a Hamming code generator 15 which produces the appropriate Hamming code. This code is written into the store 10 along with the data. Each data word read out of the store 10 is fed, along with the associated Hamming code, to a checking circuit 16. This circuit is capable of detecting double bit errors in any data word, and of detecting and correcting single bit errors. In the latter case, the checking circuit 16 indicates which bit is in error, and controls an inverter circuit 17 so as to invert and hence correct the faulty bit.

Hamming code generation and checking circuits are well known in the art and hence these circuits will not be described in any further detail in this specification.

Figure 2:
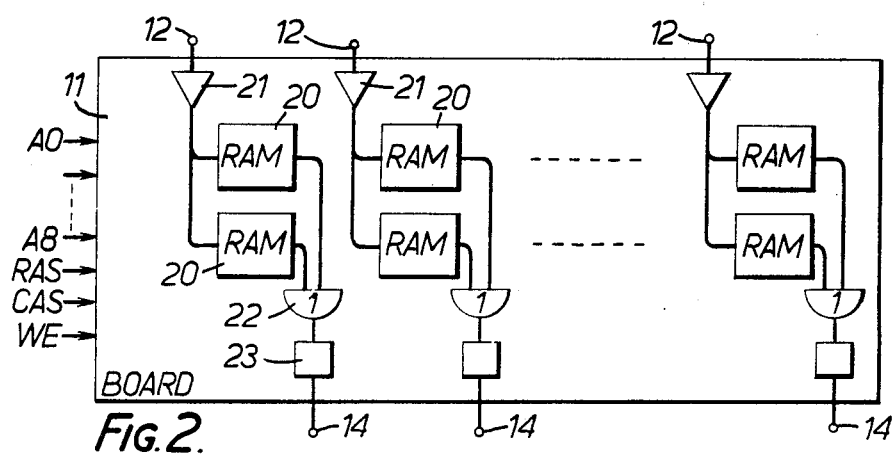
FIG. 2 shows one circuit board in greater detail.

Referring now to FIG. 2, this shows one of the circuit boards 11 in greater detail. The board carries twenty six random access memory (RAM) chips 20, arranged in two rows and thirteen columns. Each chip contains 256K individually addressable bits. The three circuit boards thus have a total of thirty-nine columns, each column containing two chips 20 with a total of 512K bit locations i.e. one bit for each word. The bits of each data word (and the Hamming bits) are distributed among the columns with one bit of each word per column. It should be noted that the bits of any given word are all in the same row of chips.

Each data input terminal 12 is connected by way of a driver circuit 21 to the data inputs of the corresponding column of memory chips 20. The data outputs of each column of chips 20 are combined in an OR-gate 22 and fed by way of a data output buffer 23 to the appropriate one of the thirteen output terminals 14.

In order to address one of the 256K locations in a chip, it is necessary to supply an 18-bit address. This address is supplied to the board in two successive 9-bit portions, over nine address lines A0–A8. These two portions are gated into two nine-bit address registers (not shown) in each chip by respective strobe signals RAS and CAS. The two rows of chips have separate RAS signals and this serves to select between the two rows, so as to address one of the two 256K halves of the store. Various other control signals such as a write enable signal WE are also provided for controlling the chips 20, but these are not described here since they are not relevant to an understanding of the present invention.

Figure 3:
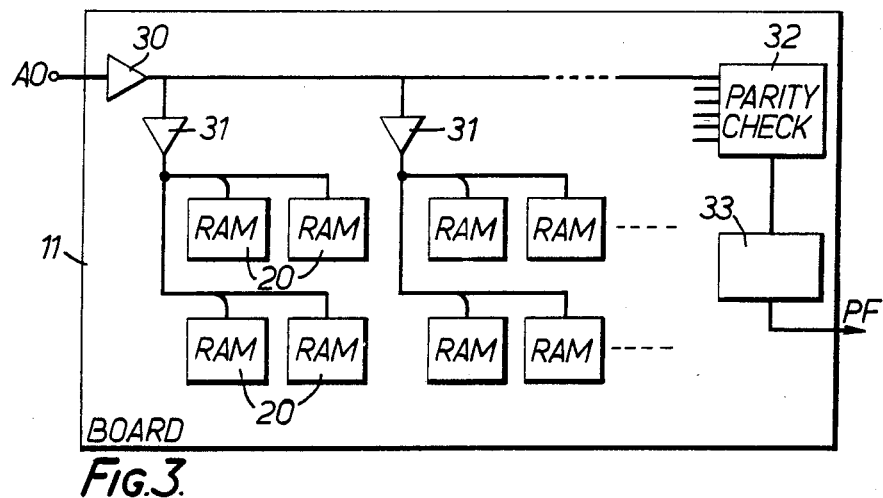
FIG. 3 shows the way in which control signals are distributed to chips on the circuit board.

It can be seen that there are various control signals such as the address signals A0–A8, the strobe signal CAS, and the write enable signal WE which must be distributed to every chip on the board. Referring to FIG. 3, this shows the way in which one of the control signals A0 is distributed. It will be understood that the other control signals are distributed in a similar manner.

The signal A0 is fed to a driver circuit 30 which produces sufficient output current to drive seven further driver circuits 31. Each of these driver circuits 31 then fans out the signal to two columns of chips 20 i.e. to four chips, two in the first row and two in the second. (The exception to this is the last of the driver circuits; since there is an odd number of columns, this fans out the signal to just one column.)

Thus, it can be seen that each driver circuit 31 fans out the signal A0 to not more than two chips in each row. As a result, if one of the driver circuits fails, not more than two chips in either row will be wrongly addressed and hence not more than two data bits in any given word will be in error. Hence the Hamming checking circuit 16 will always be able to detect such a failure.

The output of the driver circuit 30 and the similar circuits for the other control bits are also fed to a parity checking circuit 32, along with a parity bit P. This circuit checks the correctness of the control signals and, if it detects an error, produces a parity fail signal PF by way of a parity buffer register 33. It can be seen that, if any one of the driver circuits 30 fails, this will be detected by the parity checking circuit 32.

I claim:
1. Data storage apparatus comprising:
   (a) a plurality of memory devices each having a plurality of individually addressable bit storage locations, the memory devices being arranged in a plurality of columns,
   (b) output means coupled to said memory devices, for reading out a bit from each said column to provide a multi-bit output data word,
   (c) error detecting means coupled to the output means for detecting n bit errors in said multi-bit output data word, where n is greater than one, and for generating an error signal upon detection of an arror,
   (d) a signal input path for inputting a control signal, and
   (e) a plurality of driver circuits each having an input connected to said input path to receive the control signal and an output connected to the memory devices in no more than n of said columns, at least some of the driver circuits having their outputs each connected to the memory devices in at least two of said columns, whereby, if any one of said driver circuits fails, no more than n bits in said output data word are corrupted and hence the failure can be detected by the error detecting means.

2. Apparatus according to claim 1 wherein at least some of the driver circuits have their outputs each connected to the memory devices in exactly n of said columns.

3. Data storage apparatus comprising:
   (a) a plurality of memory devices, each having a plurality of individually addressable bit storage locations, a data output, and an address input, the memory devices being arranged in a plurality of columns,
   (b) output means coupled to the data outputs of the memory devices, for reading out a bit from each said column to provide a multi-bit output data word,
   (c) error detecting means coupled to the output means for detecting n bit errors in said multi-bit output data word, where n is greater than one, and for generating an error signal upon detection of an error,
   (d) address input paths for inputting a multi-bit address signal,
   (e) a first plurality of driver circuits, each having an input connected to a respective one of the address input paths, and an output,
   (f) parity checking means connected to the outputs of the first plurality of driver circuits for checking the multi-bit address signal after it has passed through those driver circuits, and
   (g) for each of said first plurality of driver circuits, a further plurality of driver circuits, each having an input connected to the output of that first driver circuit and having an output connected to the address inputs of the memory devices in no more than n of said columns, at least some of the further plurality of driver circuits having their outputs each connected to the address inputs of the memory devices in at least two of said columns, whereby, if any one of said driver circuits fails, no more than n bits in said data output word are corrupted and hence the failure can be detected by the error detecting means.

* * * * *